Figure 1:
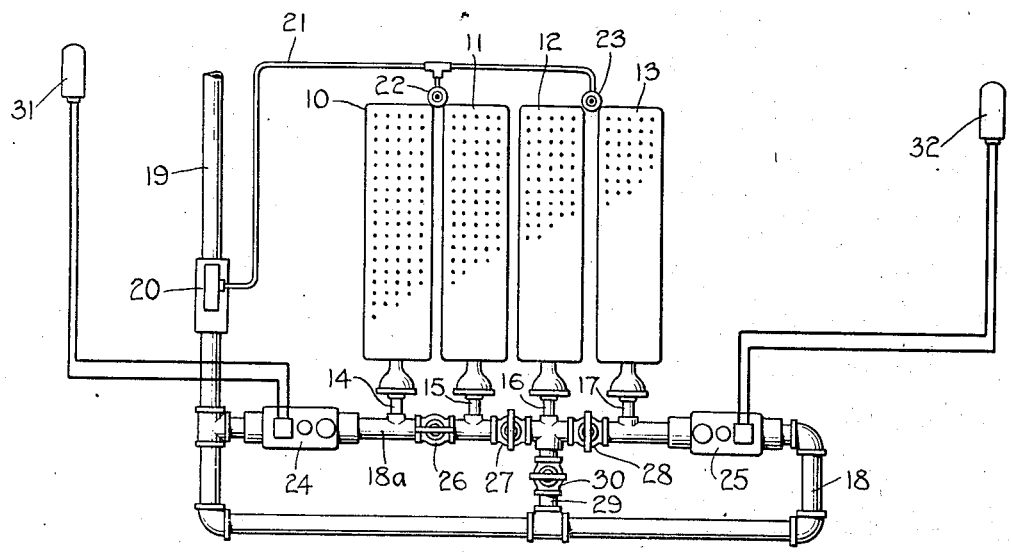

Nov. 3, 1942.    H. A. FABER    2,300,560

HEAT CONTROLLING APPARATUS

Filed Dec. 8, 1939

INVENTOR
Herbert A. Faber
BY Henry J. Lucke
HIS ATTORNEY

Patented Nov. 3, 1942

2,300,560

UNITED STATES PATENT OFFICE 2,300,560

HEAT CONTROLLING APPARATUS

Herbert A. Faber, Cincinnati, Ohio

Application December 8, 1939, Serial No. 308,124

10 Claims. (Cl. 236—1)

This invention relates to methods of controlling the heat output of heating plants, and to apparatus for carrying out the method.

The method of the invention may be employed in connection with a great variety of types of heating plants so long as a plurality of individually supplied fuel burning units make up the firing mechanism of each plant. It is particularly useful, however, in its application to gas fired heating plants of the hot water circulatory type.

In the heating of buildings, especially domestic establishments, it is customary to control the heating plant in accordance with variations of temperature within the building regardless of outside temperature. In certain instances, however, there has been provided a system of control which is responsive to variations in temperatures both within the building and outside the building, the resultant of the two temperatures, at any given time, being the control criterion relative to the fuel-supplying apparatus as an entirety.

The present method is designed to effect control of the heating system in response to variations of only the inside temperature, over a prescribed range of outside temperatures, and in response to variations of both inside and outside temperatures, over another prescribed range of outside temperatures. The apparatus of the invention is designed to carry out the method by means of a very simple and economical structural arrangement.

In preferred embodiments of the apparatus, a partially automatic and a partially manual manipulation of control instrumentalities accomplishes the desired control of the heat output of the plant, although provision may be made for entirely automatic control if found desirable.

The apparatus may be arranged in such manner as to be readily adaptable to well known types of heating plants now on the market.

A hot water circulatory heating plant is ideally suited for control pursuant to this invention, for the heating medium which actually circulates is capable of assuming different heating temperatures depending upon the degree and extent of heat applied to it. In a steam circulatory heating plant, on the other hand, the circulation of steam through the radiators of the system depends upon the generation of a volume of steam under suitable pressure. Since, however, the water in the boiler retains a certain residual heat after the application of heat thereto has ceased, rendering it capable—dependent upon the degree of residual heat—of quickly generating steam upon the renewed application of heat thereto, the invention may be applied to advantage for regulating the residual heat of the water, and, thus, for controlling the heat output of the system in terms of the rapidity of generation of steam rather than of the temperature of the heating medium supplied to the radiators of a hot water heating system.

As applied to gas fired heating plants, an outstanding feature of the apparatus resides in the substitution of a loop type header for the conventional single line header serving to supply gas to the individual burner units which branch off, respectively, from the header, and in the provision of suitably regulatable valves in the header for determining which and how many of the individual burners will be supplied with gas at any given inside and outside temperatures.

While the invention is here illustrated and described with respect to its application specifically to gas fired heating apparatus, a similar arrangement of burners, fluid fuel supply lines, and control instrumentalities may be provided to suit other types of heating plants, utilizing other types of fluid fuel, such as oil, without departing from the generic scope of the invention. Also, the method may be employed in connection with solid fuel stoked heating plants so long as each plant is equipped with a plurality of the stoker units.

Further features and objects of the invention will be apparent from the following detailed description and accompanying drawing.

In the drawing—

Figure 2:
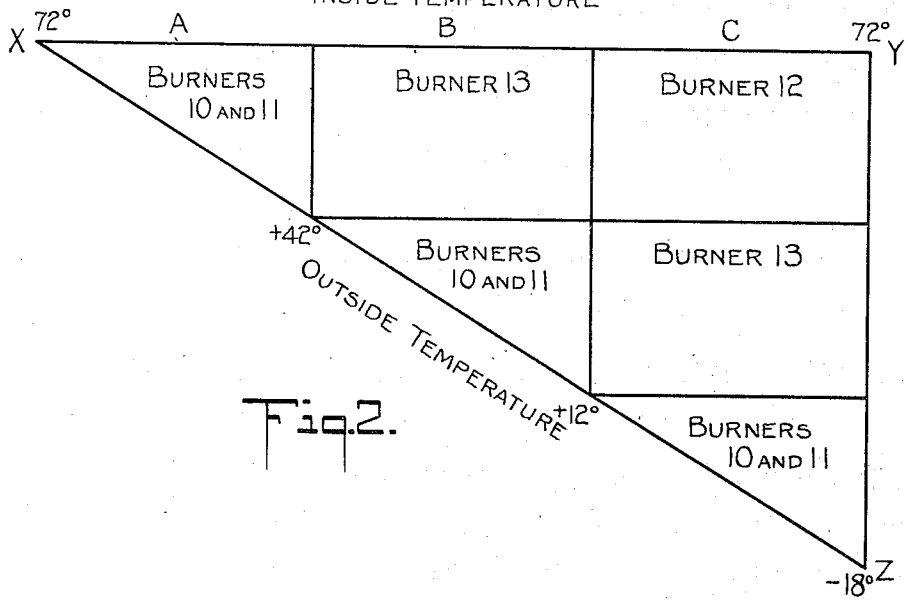

Fig. 1 represents a plan view, partly diagrammatic, of a preferred arrangement, pursuant to the invention, of burners, fuel supply lines, and control instrumentalities for application to a conventional gas fired heating plant; and Fig. 2 is a chart graphically illustrating functional characteristics of the method as carried out by the apparatus of Fig. 1.

The method of the invention involves controlling respective individual firing units of a heating plant, in certain instances automatically and in certain instances manually, in response to variations in temperature both within the enclosure served by the heating plant and outside of that enclosure.

The chart of Fig. 2 indicates, by the horizontal line XY, the mean temperature maintained within the enclosure during operation of the heating plant, and, by the downwardly directed diagonal line XZ, the variation in atmospheric temperature outside the enclosure. The vertical zones marked off between the two lines XY and XZ and indicated A, B, and C, respectively, each include a different range of outside temperatures. Within the zones are indicated the particular firing units rendered operative pursuant to the method.

It is contemplated that an inside thermostat will automatically regulate the operation of one or more of the firing units to furnish the heat for zone A, where the outside temperatures are comparatively high, and that an outside thermostat will automatically set one or more of the other firing units in operation when the outside temperature drops into the range comprehended by zone B. Thus, the lower temperatures of zone B will be counteracted by operation of firing units controlled by both inside and outside thermostats. When the outside temperature drops into the range comprehended by zone C, one or more of the remaining firing units may be set in operation either manually or automatically. In the former instance, the outside thermostat is reset to be responsive to temperatures within the range of zone C.

Thus, it will be seen that the method of the invention is of general application to heating plants which are each served by a plurality of firing units, for regulating the heat outputs of the plants pursuant to temperatures both inside and outside enclosures heated thereby.

The method of the invention may be carried out in various ways depending upon the type of heating plant to which it is applied.

Preferred apparatus pursuant to the invention is ideally suited for application to existing types of heating plants, since the inventive structure comprehends only the fuel burners, fuel supply line, and control instrumentalities.

The embodiment illustrated in Fig. 1 is intended for application to a conventional type of gas fired heating plant, preferably of hot water circulatory type.

Individual gas burners 10, 11, 12, and 13 are connected by branch feeder lines 14, 15, 16, and 17, respectively, to the manifold section 18a of a loop configurated fuel supply header 18. A supply line 19 connects the loop header 18 with any suitable source of fuel supply, such as a gas main.

As is usual, an automatic safety valve 20 of conventional construction is interposed in the supply line 19 at a location controlling the flow of gas into the loop header 18. The small feed line 21 connects at one end with the safety valve 20, and at the other end with pilot burners 22 and 23, the pilot burners being each disposed between two adjacent main burners for maintaining, at all times, a flame effective to automatically light the main burners. The safety valve 20 and the small feed line 21, leading to the pilot burners, are so arranged that, should the pilot lights go out, the safety valve will automatically shut off the supply of gas to the header.

The loop configuration of the gas supply header is a feature of the invention, for it provides a suitable basis for the application of the desired control instrumentalities.

Adjacent one end of the manifold section 18a of the header 18, a thermostatically controlled shut off valve 24, of conventional type, is interposed in such manner as to control the flow of gas to the main burners 10, 11, 12, and 13, and, adjacent the opposite end thereof, a similar thermostatically controlled valve 25 is disposed in such manner as to accomplish the same result. Between the branch feed lines 14 and 15, which serve the main burners 10 and 11, respectively, is interposed a manually controllable shut off valve 26 of conventional type. A similar valve 27 is interposed between branch feed lines 15 and 16, which serve the main burners 11 and 12, respectively, and, likewise, a similar valve 28 is interposed between the branch feed lines 16 and 17, which serve the main burners 12 and 13, respectively. For a purpose hereinafter made clear, a by-pass conduit 29 connects the manifold section 18a of the loop header 18 with the opposite section thereof, the conduit 29 having interposed between its ends the manually controllable valve 30, which may be similar in type to the manually controllable valves 26, 27, and 28.

A thermostat, indicated 31, of conventional construction, is connected to the valve 24 for automatically controlling the latter according to variations in temperature. It is contemplated that the thermostat 31 be placed within an enclosure to be heated by the heating plant with which the aforedescribed apparatus is associated, and, accordingly, will be hereinafter referred to as the "inside thermostat."

A thermostat 32 of suitable conventional construction is connected with the valve 25 for automatically controlling the latter according to variations in temperature. It is contemplated that the thermostat 32 be placed outside the enclosure to be heated by the plant with which the aforedescribed apparatus is associated, and, accordingly, will be hereinafter referred to as the "outside thermostat."

By the aforedescribed apparatus, a very effective control of the heating plant will be had in response to both inside and outside temperatures.

Operative characteristics of the apparatus of Fig. 1 are graphically portrayed in the chart of Fig. 2.

A temperature of 72° F. is arbitrarily selected as the optimum inside temperature for an enclosure heated by the apparatus of Fig. 1. It is indicated, along the top horizontal line XY of the chart, as being constantly maintained. The outside temperature varies according to the weather of the locality in which the enclosure is situated, and is indicated along the diagonally descending line XZ as ranging from 72° F. down to −18° F.

The chart, of course, is arbitrarily drawn up with respect to the particular temperature ranges and particular combinations of burner units. Obviously, however, the thermostats and the manually adjustable valves may be set to operate the burner units as found desirable in various circumstances.

In the particular circumstances covered by the chart of Fig. 2, the inside thermostat 31 is set to open the valve 24 for temperatures below 72° and to close the valve 24 for temperatures thereabove.

For the apparatus of Fig. 1, opening of valve 24 means supplying one or more of the burner units 10, 11, 12, and 13, depending upon the setting of the manually operable valves, with gas. Normally, valve 26 will be open and valve 27 will be closed, thus subjecting the two burners 10 and 11 simultaneously to the control of inside thermostat 31. If desired, however, burner 11 may be cut out by closing valve 26. Or, if desired, additional burners and additional valves may be supplied, within reasonable limits, to the apparatus to suit special heating requirements.

The outside thermostat 32 is set to open the valve 25 at outside temperatures below 42°, and to turn off the valve 25 at outside temperatures thereabove. Accordingly, it will be seen from the chart that the first vertical temperature zone indicated A is serviced by the burners 10 and 11 as controlled by the inside thermostat, and the vertical temperature zone indicated B is serviced by the same two burners 10 and 11 as controlled by the inside thermostat, plus one or more additional burners, dependent upon the setting of the remaining manually controlled valves. As indicated in Fig. 1, the valve 28 will normally be closed, as will the valve 30 in the by-pass 29. Thus, only burner 13 will be added to the burners 10 and 11 in furnishing heat to the heating plant when outside temperatures drop below 42°.

It will be seen that burner 13 remains in operation so long as the outside temperature is below 42°, and the temperature inside the enclosure will be automatically regulated by the inside thermostat 31. When the air in the enclosure attains a temperature greater than 72°, the inside thermostat 31 will automatically close the valve 24 and put the burners 10 and 11 out of operation.

In exceptionally cold weather, that is when the temperature drops below 12°, the valve 30 in the by-pass 29 may be opened manually. Thus, burner 12 will be added to the burners operative in furnishing heat to the heating plant. Burner 12 operates independently of the automatically regulated valves 24 and 25, and, when turned on, will remain on continuously until turned off. Accordingly, outside thermostat 32 may be reset to open the valve 25 below 12° and to close it above 12°. The vertical heating zone indicated C will be served by all of the burners, the burner 12 remaining on constantly, the burner 13 going on and off automatically according to the outside temperatures, and the burners 10 and 11 going on and off automatically according to the inside temperatures.

It will be obvious that manually controlled valve 30 may be replaced by a thermostatically controlled valve, similar to the valves 24 and 25, for regulation by an outside thermostat which corresponds to the thermostat 32, and which may be set to turn the valve on below 12° and to turn the valve off thereabove. In such case, the outside thermostat 32 need not be reset. The system will be entirely automatic. Since, however, extremely low outside temperatures are abnormal in most localities, and, when they do occur, they last for only a few days, the illustrated arrangement is usually preferable. Also, additional burner units may be supplied to the apparatus, if desired, between the valves 27 and 28 and between the valves 28 and 25. It should be noted that all of the thermostatically controlled valves are preferably so constructed as to also be manually controllable.

Whereas this invention has been specifically illustrated and described with respect to certain preferred embodiments thereof, many changes may be made without departing from the generic inventive scope as set forth herein and in the following claims.

I claim:

1. In a system for heating an enclosed space, a plurality of individual fluid fuel burners, a conduit supply header of loop configuration for supplying fluid fuel to said burners, said burners communicating individually with said supply header at spaced locations along one portion thereof, valve means disposed in said supply header to one side of said one portion with which the burners communicate, valve means disposed in said supply header to the other side of said one portion, means for the supply of fluid fuel to said supply header, said means being disposed between the said valve means in the remaining portion of said supply header, automatic means for controlling the operation of one of the said valve means, automatic means for controlling the operation of the other of the said valve means, and valves disposed in said one portion of the supply header between certain of said burners for controlling supply of fluid fuel to those burners.

2. In a system for heating an enclosed space, a plurality of individual fluid fuel burners, a conduit supply header of loop configuration for supplying fluid fuel to said burners, said burners communicating individually with said supply header at spaced locations along one portion thereof, valve means disposed in said supply header to one side of said one portion with which the burners communicate, valve means disposed in said supply header to the other side of said one portion, means for the supply of fluid fuel to said supply header, said means being disposed between the said valve means in the remaining portion of said supply header, automatic means for controlling the operation of one of the said valve means, automatic means for controlling the operation of the other of the said valve means, valves disposed in said one portion of the supply header between certain of said burners for controlling supply of fluid fuel to those burners, a by-pass conduit leading from the said remaining portion of said loop supply header to the said one portion with which the burners communicate, and a valve disposed in said by-pass conduit for controlling flow of fluid fuel therethrough.

3. In a system for heating an enclosed space, a plurality of individual fluid fuel burners, a conduit supply header of loop configuration for supplying fluid fuel to said burners, said burners communicating individually with said supply header at spaced locations along one portion thereof, valve means disposed in said supply header to one side of said one portion with which the burners communicate, valve means disposed in said supply header to the other side of said one portion, means for the supply of fluid fuel to said supply header, said means being disposed between the said valve means in the remaining portion of said supply header, thermostatic means disposed within the enclosed space for controlling the operation of one of the said valve means, thermostatic means disposed outside the enclosed space for controlling the operation of the other of the said valve means, and valves disposed in said one portion of the supply header between certain of said burners for controlling supply of fluid fuel to those burners.

4. In a system for heating an enclosed space, a plurality of individual fluid fuel burners, a conduit supply header of loop configuration for supplying fluid fuel to said burners, said burners communicating individually with said supply header at spaced locations along one portion thereof, valve means disposed in said supply header to one side of said one portion with which the burners communicate, valve means disposed in said supply header to the other side of said one portion, means for the supply of fluid fuel to said supply header, said means being disposed between the said valve means in the remaining portion of said supply header, thermostatic means disposed within the enclosed space for controlling the operation of one of the said valve means, thermostatic means disposed outside the enclosed space for controlling the operation of the other of the said valve means, valves disposed in said one portion of the supply header between certain of said burners for controlling supply of fluid fuel to those burners, a by-pass conduit leading from said remaining portion of said loop supply header to the said one portion with which the burners communicate, and a valve disposed in said by-pass conduit for controlling flow of fluid fuel therethrough.

5. Gas burning and control equipment comprising a plurality of individual gas burners, a conduit gas supply header of loop configuration having a manifold portion with which the said gas burners individually communicate at spaced locations, a gas supply line connected to the remaining portion of said supply header, valve means disposed in said manifold portion adjacent one end thereof, valve means disposed in said manifold portion adjacent the other end thereof, a thermostat operative to automatically control one of said valve means, a thermostat operative to automatically control the other of said valve means, and manually operable valve means disposed in said manifold portion between said individual gas burners.

6. In a system for heating an enclosed space, a plurality of individual fuel burners disposed side-by-side in mutually adjacent relationship and making up a compact fuel burning unit adapted for positioning in a single fire chamber, a fuel supply system adapted to feed fuel to said individual fuel burners, automatically regulatable means for controlling the feed to certain of said fuel burners, automatically regulatable means for controlling the feed to other of said fuel burners, temperature responsive means adapted for positioning within the said enclosed space for controlling one of said fuel feed controlling means, temperature responsive means adapted for positioning outside said enclosed space for controlling the other of said fuel feed controlling means, the two said temperature responsive means being entirely independent of each other in their control characteristics, and respective control means disposed in said fuel supply system between said individual fuel burners for determining which of said fuel burners will be controlled by the respective automatic control means.

7. In a system for heating an enclosed space, a plurality of individual fuel burners disposed side-by-side in mutually adjacent relationship and making up a compact fuel burning unit adapted for positioning in a single fire chamber, a fuel supply system adapted to feed fuel to said individual fuel burners, automatically regulatable means for controlling the feed to certain of said fuel burners, automatically regulatable means for controlling the feed to other of said fuel burners, temperature responsive means adapted for positioning within the said enclosed space for controlling one of said fuel feed controlling means, temperature responsive means adapted for positioning outside said enclosed space for controlling the other of said fuel feed controlling means, the two said temperature responsive means being entirely independent of each other in their control characteristics, and respective, manually settable control means disposed in said fuel supply system between said individual fuel burners for determining which of said fuel burners will be controlled by the respective automatic control means.

8. A multiple burner manifold for fluid-burning heating systems comprising an endless loop conduit, a plurality of burner connections spaced apart along a portion of the length of said loop conduit, valves disposed in said burner connection portion of said loop conduit between said burner connections for controlling flow of fluid into said burners, a supply connection disposed in said loop conduit outside of said burner connection portion thereof, and valves disposed in said loop conduit at opposite sides of said supply connection and between said supply connection and opposite ends of said burner connection portion for controlling flow of fluid into said burner connection portion of said loop conduit.

9. A multiple burner manifold for fluid-burning heating systems comprising an endless loop conduit, a plurality of burner connections spaced apart along a portion of the length of said loop conduit, valves disposed in said burner connection portion of said loop conduit between said burner connections for controlling flow of fluid into said burners, a supply connection disposed in said loop conduit outside of said burner connection portion thereof, a by-pass conduit connecting that portion of said loop conduit which lies between the last-named valves with the said burner connection portion thereof, and a valve disposed in said by-pass conduit for controlling flow of fluid therethrough.

10. A multiple burner manifold for fluid-burning heating systems comprising an endless loop conduit, a plurality of burner connections spaced apart along a portion of the length of said loop conduit, manually settable valves disposed in said burner connection portion of said loop conduit between said burner connections for controlling flow of fluid into said burners, a supply connection disposed in said loop conduit outside of said burner connection portion thereof, automatically regulatable valves disposed in said loop conduit at opposite sides of said supply connection and between said supply connection and opposite ends of said burner connection portion for controlling flow of fluid into said burner connection portion of said loop conduit.

HERBERT A. FABER.